(12) United States Patent
Igarashi et al.

(10) Patent No.: US 6,860,149 B2
(45) Date of Patent: *Mar. 1, 2005

(54) MASS AIRFLOW MEASURING APPARATUS

(75) Inventors: Shinya Igarashi, Naka-machi (JP); Atsushi Kanke, Hitachi (JP); Rintarou Minamitani, Tsukuba (JP); Keiichi Nakada, Hitachinaka (JP); Izumi Watanabe, Hitachinaka (JP)

(73) Assignees: Hitachi, Ltd., Tokyo (JP); Hitachi Car Engineering Co., Ltd., Hitachinaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 10/652,029

(22) Filed: Sep. 2, 2003

(65) Prior Publication Data

US 2004/0035195 A1 Feb. 26, 2004

Related U.S. Application Data

(63) Continuation of application No. 10/157,984, filed on May 31, 2002, now Pat. No. 6,672,153.

(30) Foreign Application Priority Data

Dec. 5, 2001 (JP) ....................................... 2001-370783

(51) Int. Cl.⁷ ................................................. G01F 1/68
(52) U.S. Cl. .................................. 73/204.15; 73/118.2
(58) Field of Search ........................... 73/204.15, 118.2, 73/204.16; 702/130, 136

(56) References Cited

U.S. PATENT DOCUMENTS

| | | | | |
|---|---|---|---|---|
| 4,322,970 A | * | 4/1982 | Peter .......................... | 73/118.2 |
| 4,462,251 A | * | 7/1984 | Sumal ........................ | 73/118.2 |
| 4,565,091 A | | 1/1986 | Ito et al. | |
| 4,579,098 A | | 4/1986 | Mattes et al. | |
| 4,759,333 A | * | 7/1988 | Shimomura et al. ........ | 123/494 |
| 4,771,632 A | | 9/1988 | Kubo | |
| 6,435,023 B1 | * | 8/2002 | Kobayashi et al. ...... | 73/204.25 |
| 6,476,627 B1 | * | 11/2002 | Pelissier et al. ............ | 324/760 |
| 6,672,153 B2 | * | 1/2004 | Igarashi et al. .......... | 73/204.15 |

FOREIGN PATENT DOCUMENTS

| | | |
|---|---|---|
| JP | 58087421 | 5/1983 |
| JP | 63184018 | 7/1988 |
| JP | 07-317584 | 5/1995 |

OTHER PUBLICATIONS

Search Report.

* cited by examiner

Primary Examiner—Edward Lefkowitz
Assistant Examiner—Jewel V. Thompson
(74) Attorney, Agent, or Firm—Crowell & Moring LLP

(57) ABSTRACT

To offer a mass airflow measuring apparatus in which the effect of the adhesion onto the heating resistor caused while the engine is off is reduced and the measuring accuracy is improved. The apparatus measures the mass airflow of the air sucked into the internal combustion engine, using the heating resistor 1. The power control circuit 4 maintains the heating resistor 1 temperature equal to or higher than the temperature during the operation of the internal combustion engine after the internal combustion engine has stopped and until the temperature of the internal combustion engine and its apparatuses installed in the suction system has lowered below the generation temperature of volatile gas such as oil vapor. The power control circuit 4, using the temperature sensing resistor 2 that detects the temperature of the air sucked into the combustion engine, detects the air temperature and maintains the heating resistor 1 temperature, based on the temperature measured, equal to or higher than the temperature during the operation of the internal combustion engine even after the internal combustion engine has stopped.

6 Claims, 3 Drawing Sheets

US 6,860,149 B2

MASS AIRFLOW MEASURING APPARATUS

This application is a continuation of Ser. No. 10/157,984 May 31, 2002 U.S. Pat. No. 6,672,153.

BACKGROUND OF THE INVENTION

The present invention applies to a mass airflow measuring apparatus that measures the mass airflow through the suction air path of an internal combustion engine, particularly to an heating-resistor type mass airflow measuring apparatus that measures the mass airflow using an heating resistor.

In a conventional heating-resistor type mass airflow measuring apparatus, the current through the heating resistor is so controlled that the heating resistor temperature is higher by a specified temperature than that of the temperature-sensing resistor that detects the suction air temperature, and the suction mass airflow is measured in terms of the current through the heating resistor.

The conventional heating-resistor type mass airflow measuring apparatus is found to involve a problem that, when the engine has stopped and the airflow through the suction system has ceases, gaseous material flows by diffusion and evaporation out of the engine and its apparatuses installed in the suction system in the downstream of the heating-resistor type mass airflow measuring apparatus and reaches the installation point of the heating-resistor type mass airflow measuring apparatus and adheres onto the heating resistor, a mass airflow detecting element. In particular, since volatile gas such as oil vapor evaporates and diffuses when the temperature of the engine or its apparatuses installed in the suction system is higher than the vaporization temperature of the gas after the engine stoppage, and flows backward to the installation point of the heating-resistor type mass airflow measuring apparatus, it adheres onto the heating resistor exposed to the suction air. The adhesion of the gas results in the degradation of the measuring accuracy of the heating-resistor type mass airflow measuring apparatus because of corrosion and/or contamination of the heating resistor. In addition, the adhesion may result in accelerated adhesion of foreign substance such as dust onto the heating resistor. As a result, there arises a problem that the measuring accuracy of the mass airflow measuring apparatus degrades.

As an art relating to the present invention, there is disclosed a mass airflow measuring apparatus, for example, in a Japanese Application Patent Laid-Open Publication No. 3146850, where the apparatus is kept electrified continuously even after the engine stoppage so as to lessen the degradation of the measuring accuracy of the mass airflow measuring apparatus just after the engine start. This, however, continues electrification of the mass airflow measuring apparatus throughout the engine stoppage and the object of the electrification is to lessen the degradation of the measuring accuracy just after the engine start.

SUMMARY OF THE INVENTION

An object of the present invention is to offer a mass airflow measuring apparatus in which the effect of the adhesion onto the heating resistor caused while the engine is off is reduced and the measuring accuracy is improved.

(1) To achieve the above object, according to the present invention, there is provided an heating-resistor type mass airflow measuring apparatus, comprising an heating resistor which detects the mass airflow of the air sucked into an internal combustion engine and an electronic circuit which, connected to this heating resistor electrically, outputs a signal corresponding to the suction mass airflow, using the heating resistor; further comprising a temperature maintaining means which, after the internal combustion engine has stopped, maintains the heating resistor temperature equal to or higher than the temperature during the operation of the internal combustion engine until the temperature of the internal combustion engine and its apparatuses installed in the suction system has lowered below the generation temperature of volatile gas such as oil vapor.

With the above construction, it becomes possible to reduce the effect of the adhesion onto the heating resistor caused while the engine is off and improve the measuring accuracy.

(2) In the above (1), it is preferred that the mass airflow measuring apparatus further comprises a temperature detecting means which detects the temperature of the air sucked into the internal combustion engine, and the temperature maintaining means maintains the heating resistor temperature, based on the temperature detected by the temperature detecting means, equal to or higher than the temperature during the operation of the internal combustion engine even after the internal combustion engine has stopped.

(3) In the above (1), it is preferred that the mass airflow measuring apparatus further comprises a water temperature detecting means which detects the temperature of the cooling water of the internal combustion engine, and the temperature maintaining means maintaining the heating resistor temperature, based on the temperature detected by the water temperature detecting means, equal to or higher than the temperature during the operation of the internal combustion engine even after the internal combustion engine has stopped.

(4) In the above (1), it is preferred that the temperature maintaining means maintains the heating resistor temperature, based on the elapsed time after the stoppage of the internal combustion engine, equal to or higher than the temperature during the operation of the internal combustion engine even after the internal combustion engine has stopped.

(5) In the above (4), it is preferred that the temperature maintaining means maintains the heating resistor temperature, for the same length of time as the operation of the cooling fan of the internal combustion engine after the engine stoppage, equal to or higher than the temperature during the operation of the internal combustion engine even after the internal combustion engine has stopped.

(6) In the above (1), it is preferred that the temperature maintaining means judges the stoppage of the internal combustion engine based on the mass airflow detected by the heating resistor.

(7) In the above (1), it is preferred that the mass airflow measuring apparatus further comprises a means which adds a mass airflow dependency to the apparatus so that the heating temperature of the heating resistor becomes higher on the very-low mass airflow side.

PREFERRED EMBODIMENT OF THE INVENTION

Figure 1:
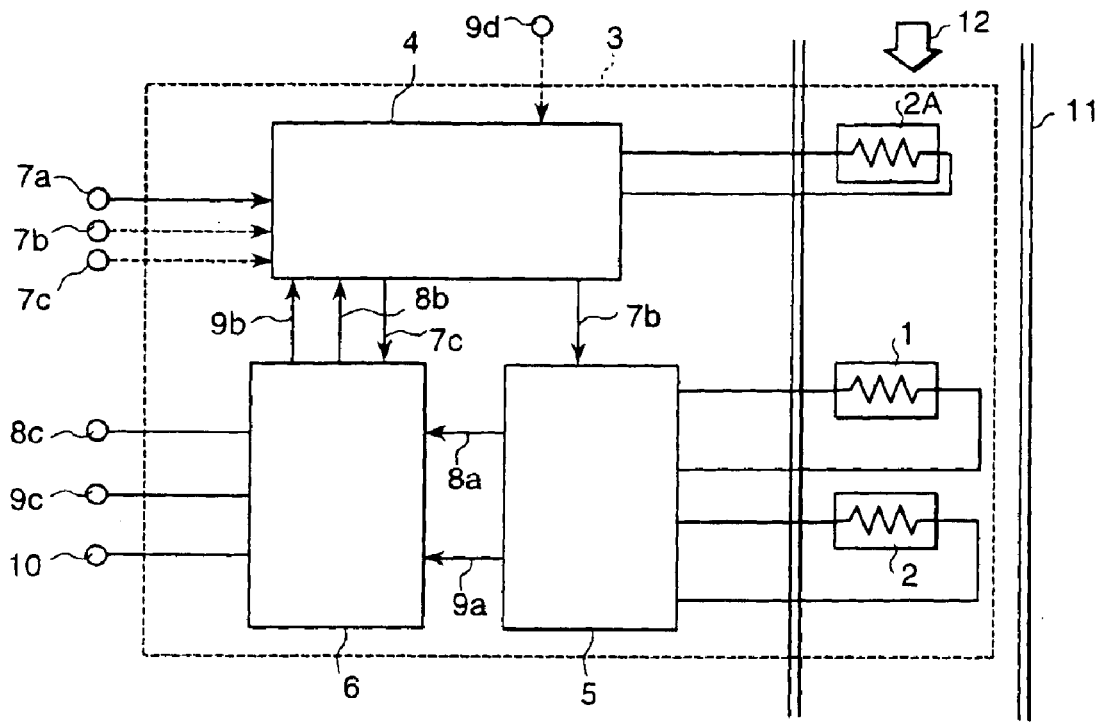
FIG. 1 is a block diagram showing the construction of the mass airflow measuring apparatus according to the first preferred embodiment of the present invention.

The construction and operation of the mass airflow measuring apparatus according to the first preferred embodiment of the present invention is explained hereunder, using FIG. 1.

FIG. 1 is a block diagram showing the construction of the mass airflow measuring apparatus according to the first preferred embodiment of the present invention.

An heating-resistor type mass airflow measuring apparatus 3 comprises an heating resistor 1, temperature sensing resistor 2, power control circuit 4, and an heating-resistor heating control circuit 5 (hereinafter called the "control circuit 5").

The heating resistor 1 and temperature sensing resistor 2 are installed inside the suction pipe 11 of the internal combustion engine. The heating resistor 1 and temperature sensing resistor 2 are connected to the control circuit 5. The heating-resistor heating control circuit 5 so controls that the heating temperature of the heating resistor 1 has nearly equal differential from the suction temperature detected by the temperature sensing resistor 2. Because of this, the control circuit 5 is capable of detecting the suction mass airflow based on the heat radiation from the heating resistor 1 to the suction air 12. The control circuit 5 outputs to an output adjusting circuit 6 a mass airflow signal 8a indicating the mass airflow through the suction pipe 11 and a suction air temperature signal 9a indicating the temperature of the suction air. The suction air temperature signal 9a can be obtained from the resistance of the temperature sensing resistor 2.

The output adjusting circuit 6 adjusts the O-span and sensitivity of the mass airflow signal 8a and suction air temperature signal so that the signals are suitable for output to external devices, including an engine control unit (hereinafter called the "ECU"), for controlling the fuel injection and ignition timing, and outputs a mass airflow signal 8c and suction air temperature signal 9c for external outputs. A terminal 10 is a ground terminal.

The apparatus according to this embodiment further comprises the power control circuit 4. Power to the power control circuit 4 is supplied from a power supply terminal 7a. Power from the outside is supplied through the power line 7b and 7c to the control circuit 5 and output adjusting circuit 6, respectively, via the power control circuit 4. The power control circuit 4 (power supply terminal 7a) is connected directly to a battery with no intervention of an ignition switch (but something like a fuse may intervene), and hence connected with the power supply all the time including the duration of the engine stoppage. On the other hand, power supply to the control circuit 5 and output adjusting circuit 6 is controlled by the power control circuit 4.

The power control circuit 4 so controls that power is supplied to the control circuit 5 or to both control circuit 5 and output adjusting circuit 6 after the engine has stopped and until the temperature of the engine and its apparatuses installed in the suction system has lowered below the generation temperature of volatile gas such as oil vapor. With this construction, even after the engine stoppage, the heating resistor 1 temperature is maintained equal to or higher than the temperature during the operation of the engine for a specified length of time. Because of this, it becomes possible to reduce the effect of the adhesion onto the heating resistor caused while the engine is off and improve the measuring accuracy. Electrification of the heating resistor can be terminated when the temperature of the engine and its apparatuses installed in the suction system has lowered below the generation temperature of volatile gas such as oil vapor, because no volatile gas is generated and adheres onto the heating resistor any longer.

The mass airflow signal 8b and suction air temperature signal 9b are supplied to the power control circuit 4 from the output adjusting circuit 6. The mass airflow signal 8b and suction air temperature signal 9b may be the same as the mass airflow signal 8c and suction air temperature signal 9c, respectively, that is, the signals adjusted of their output by the output adjusting circuit 6 for external devices, or may be the mass airflow signal 8a and suction air temperature signal 9a themselves outputted by the heating control circuit 5. The power control circuit 4 judges the engine stoppage based on the mass airflow signal 8b. That is, it can be judged that the engine has stopped when the mass airflow becomes almost zero. The circuit, having obtained the temperature of the suction pipe from the suction air temperature signal 9b, can also judge whether the temperature of the engine and its apparatuses installed in the suction system is lower than the generation temperature of volatile gas such as oil vapor. After the engine has stopped, based on the above information, the power control circuit 4 continues supplying power to the control circuit 5 and output adjusting circuit 6 and controls so that the temperature of the heating resistor 1 is maintained equal to or higher than the temperature during the operation of the engine until the temperature of the engine and its apparatuses installed in the suction system has lowered below the generation temperature of volatile gas such as oil vapor.

Though the suction air temperature is supposed to be detected by the temperature sensing resistor 2 in the explanation above, it is permissible that a suction air temperature sensor 2A is installed inside or near the suction pipe 11, separately from the temperature sensing resistor 2 and that the power control circuit 4, obtaining the suction air temperature from the suction air temperature sensor 2A, continues supplying power to the heating resistor 1.

Since an ordinary engine control system is equipped with a water temperature sensor that detects the cooling water temperature of the engine, it is also possible that the power control circuit 4 obtains the output from the water temperature sensor as a water temperature signal 9d and estimates the temperature of the engine and its apparatuses installed in the suction system on the basis of the water temperature, and continues supplying power to the control circuit 5 and output adjusting circuit 6 and controls so that the temperature of the heating resistor 1 is maintained equal to or higher than the temperature during the operation of the engine until the temperature of the engine and its apparatuses has lowered below the generation temperature of volatile gas.

Besides, though other methods of mass airflow detection is available for the heating-resistor type mass airflow measuring apparatus 3, for example, a method employing a heater and a temperature sensing resistor heated by the heater, the present invention is also applicable similarly to those methods.

Once any material such as oil that changes into volatile gas has adhered onto the heating resistor, removing the adhesion by heating the heating resistor again is not sufficient enough because the varnish component of oil, product of a chemical reaction of the adhesion, and foreign substance that helps other foreign substances such as dust to adhere easily remain there and corrosion and deterioration of the heating resistor are caused by the adhesion. It, therefore, is very much effective for the prevention of the contamination and deterioration of the heating resistor to continue heating the heating resistor while volatile gas is generated so as to protect the heating resistor from the adhesion.

According to this embodiment, as explained above, since that power is supplied to the control circuit 5 or to both control circuit 5 and output adjusting circuit 6 after the engine has stopped and until the temperature of the engine and its apparatuses installed in the suction system has lowered below the generation temperature of volatile gas such as oil vapor, the heating resistor 1 temperature is maintained equal to or higher than the temperature during the operation of the engine for a specified length of time even after the engine stoppage. Because of this, it becomes possible to reduce the effect of the adhesion onto the heating resistor caused while the engine is off and improve the measuring accuracy.

The construction and operation of the mass airflow measuring apparatus according to the second preferred embodiment of the present invention is explained hereunder in a similar manner, using FIG. 1. The basic operation of each construction in FIG. 1 is the same as shown in FIG. 1.

As shown in FIG. 1, the apparatus is so constructed that an heating-resistor heating termination signal 7b is inputted into the power control circuit 4 from an external ECU. The ECU, which controls the stoppage of the engine, also controls heating and heating termination of the heating resistor. After the engine has stopped, the ECU supplies an heating-resistor heating signal to the power control circuit 4 so that power is supplied until the temperature of the engine and its apparatuses installed in the suction system has lowered below the generation temperature of volatile gas such as oil vapor, and when the temperature becomes lower than the specified, supplies an heating-resistor heating termination signal to the power control circuit 4. Upon the heating-resistor heating termination signal, the ECU stops supplying power to the heating resistor 1.

Also according to this embodiment, as explained above, since the heating resistor 1 temperature is maintained equal to or higher than the temperature during the operation of the engine even after the engine has stopped and until the temperature of the engine and its apparatuses installed in the suction system has lowered below the generation temperature of volatile gas such as oil vapor, it becomes possible to reduce the effect of the adhesion onto the heating resistor caused while the engine is off and improve the measuring accuracy.

The construction and operation of the mass airflow measuring apparatus according to the third preferred embodiment of the present invention is explained hereunder in a similar manner, using FIG. 1. The basic operation of each construction in FIG. 1 is the same as shown in FIG. 1.

As shown in FIG. 1, the apparatus is so constructed that an engine stoppage signal 7c is inputted into the power control circuit 4 from an external ECU. At the time of the engine stoppage, the ECU supplies the engine stoppage signal to the power control circuit 4. Even after receipt of the engine stoppage signal 7c, the power control circuit 4 continues supplying power to the heating resistor 1. On the other hand, the power control circuit 4 detects the temperature near the heating resistor 1 based on the suction air temperature signal 9b, and continues supplying power to the heating resistor 1 to continue heating until the temperature of the engine and its apparatuses installed in the suction system has lowered below the generation temperature of volatile gas such as oil vapor. And when the temperature becomes lower than the specified, the power control circuit 4 stops supplying power to the heating resistor 1.

Also according to this embodiment, as explained above, since the heating resistor 1 temperature is maintained equal to or higher than the temperature during the operation of the engine even after the engine has stopped and until the temperature of the engine and its apparatuses installed in the suction system has lowered below the generation temperature of volatile gas such as oil vapor, it becomes possible to reduce the effect of the adhesion onto the heating resistor caused while the engine is off and improve the measuring accuracy.

Figure 2:
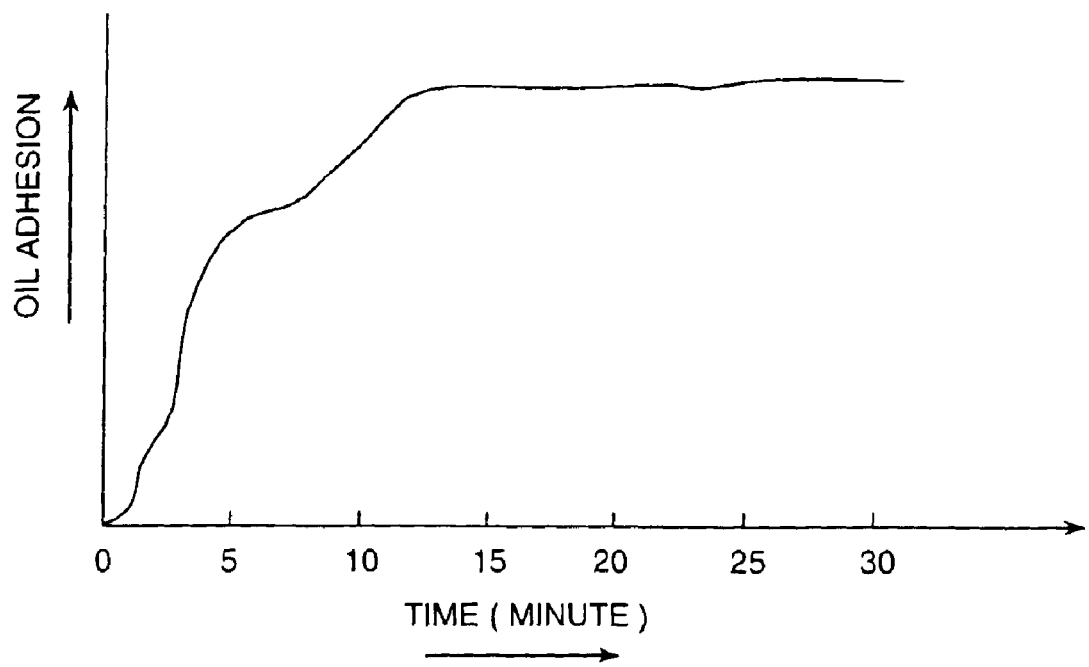
FIG. 2 is actually measured experimental data of the oil adhesion onto the heating resistor of an heating-resistor type mass airflow measuring apparatus.

Next, the construction and operation of the mass airflow measuring apparatus according to the fourth preferred embodiment of the present invention is explained hereunder, using FIG. 1 and FIG. 2. The basic operation of each construction in FIG. 1 is the same as shown in FIG. 1.

FIG. 2 shows the actually measured experimental data of the oil adhesion onto the heating resistor of an heating-resistor type mass airflow measuring apparatus.

As shown in FIG. 1, the apparatus is so constructed that an engine stoppage signal 7c is inputted into the power control circuit 4 from an external ECU. At the time of the engine stoppage, the ECU supplies the engine stoppage signal to the power control circuit 4. Upon the engine stoppage signal, the ECU measures the elapsed time after the engine stoppage with a clock installed inside and continues supplying power to the heating resistor 1 to continue heating until the elapsed time measured exceeds a specified length of time (the time until the temperature of the engine and its apparatuses installed in the suction system has lowered below the generation temperature of volatile gas such as oil vapor after the engine has stopped). After the specified time has elapsed, the power control circuit 4 stops supplying power to the heating resistor 1.

The specified length of time (the time until the temperature of the engine and its apparatuses installed in the suction system has lowered below the generation temperature of volatile gas such as oil vapor after the engine has stopped) is explained hereunder, using FIG. 2.

FIG. 2 shows the actually measured experimental data of the oil adhesion onto the heating resistor of an heating-resistor type mass airflow measuring apparatus, whose heating resistor is not heated after the engine has stopped.

A vehicle used for the experiment was of 2.5 L diesel engine equipped with a turbo charger and it was driven at a higher load (second gear) for about 10 km in the summer (temperature at about 28° C.), and the weight of oil adhered onto the heating resistor of an heating-resistor type mass airflow measuring apparatus was measured immediately after the engine stoppage.

As shown in FIG. 2, the oil adhesion ratio is higher in 5 minutes after the engine stoppage and continues to increase until about 10 minutes, and almost saturates in about 12 minutes. To prevent the oil adhesion onto the heating resistor, it is found necessary, from this experimental data, just an example though, to continue heating the heating resistor for about 15 minutes even after the engine stoppage. If it is feared that heating the heating resistor under no wind condition may result in the deterioration of the heating resistor, heating the resistor continuously for minimum 5 minutes makes it possible to reduce the oil adhesion by 60% or more. On the contrary, the maximum continuous heating time of the heating resistor for preventing the oil adhesion would be about 30 minutes, taking into account a possible variation depending upon the vehicle and engine and upon the driving condition and environment. Besides, even taking into account the heating temperature of the heating resistor, oil content, oil degradation, and other volatile gas than oil, heating the heating resistor continuously for about 1 hour can reduce the contamination of the resistor after the engine stoppage tremendously. In other words, when the heating time after the engine stoppage is used for the time control, it is preferred that the continuous heating time shall be set in a range from the minimum 5 minutes to the maximum 1 hour.

Also according to this embodiment, as explained above, since the heating resistor 1 temperature is maintained equal to or higher than the temperature during the operation of the engine even after the engine has stopped and until the temperature of the engine and its apparatuses installed in the suction system has lowered below the generation temperature of volatile gas such as oil vapor, it becomes possible to reduce the effect of the adhesion onto the heating resistor caused while the engine is off and improve the measuring accuracy.

Figure 3:
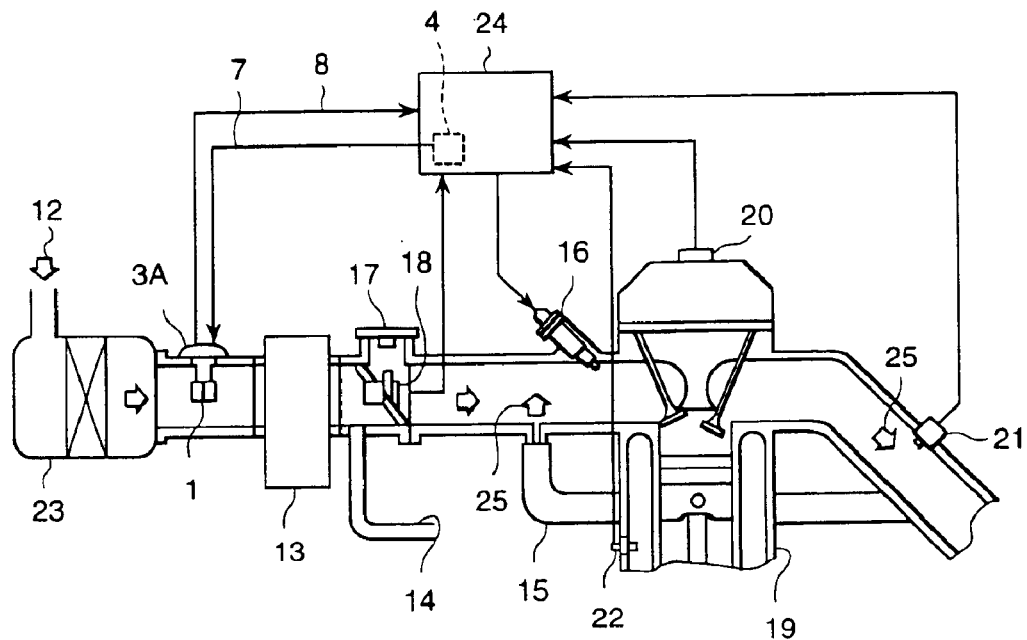
FIG. 3 is a system block diagram of the engine control system equipped with the mass airflow measuring apparatus according to the first preferred embodiment of the present invention.

Next, the construction and operation of the mass airflow measuring apparatus according to the fifth preferred embodiment of the present invention is explained hereunder, using FIG. 3.

FIG. 3 is a system block diagram of the engine control system equipped with the mass airflow measuring apparatus according to the first preferred embodiment of the present invention.

According to this embodiment, the power control circuit 4, which is installed inside the heating-resistor type mass airflow measuring apparatus 3 in an embodiment shown in FIG. 1, is installed in the ECU 24. As a result, the heating-resistor type mass airflow measuring apparatus 3A shown in FIG. 3 is equipped with the control circuit 5 and output adjusting circuit 6 shown in FIG. 1.

The overall system construction of the engine control system shown in FIG. 3 is explained hereunder. The air 12 sucked into the engine 19 is first removed of its dust through an air cleaner 23, and the mass airflow is detected by the heating-resistor type mass airflow measuring apparatus 3, in which the heating resistor 1 is installed in the suction pipe. There is installed a turbo charger 13, which compresses the suction air to improve the suction efficiency into the engine, in the downstream of the installation point of the heating-resistor type mass airflow measuring apparatus 3, where the suction mass airflow is controlled by a throttle body 17, which, interlocked with the accelerator, varies the throttle of the suction pipe, and the air mixed with fuel injected from an injector 16 is sucked into the engine. This air-fuel mixture explodes and combusts inside the engine, and then is discharged as the exhaust 25.

The heating-resistor type mass airflow measuring apparatus 3A outputs a suction mass airflow signal 8 and suction air temperature signal to the ECU 24. The ECU 24, to which a signal of the density of unburned oxygen in the exhaust detected by an oxygen density sensor 21, an angle signal from the crank angle sensor for detecting the engine speed and crank angle, and a signal of the cooling water temperature of the engine detected by a water temperature sensor 22 are inputted, determines appropriate fuel injection and ignition timing, and controls the injector 16 and others.

Because an internal combustion engine is a device for obtaining energy through the explosion and combustion of the air-fuel mixture, the engine 19 itself and its exhaust 25 are heated. Further, the turbo charger 13 becomes fairly hot as the exhaust 25 adds a rotating force of a turbine. Because lubricating oil is used in the engine crank room and turbo charger, when the engine and its components installed in the suction system become very hot, volatile gas is generated not only from the oil in those components but also from the oil scattered out of the components into the suction system and also from the fuel injected out of the injector. In addition, oil, oil vapor and exhaust itself are led into the suction system through a PCV port 14 for adjusting the crank room pressure and EGR 15 for returning the exhaust gas back to the suction system. These gases are mixed with the suction air and sucked into the engine for combustion while the engine is in operation, but reaches the installation point of the heating-resistor type mass airflow measuring apparatus 3A by evaporation and diffusion after the engine stoppage. Naturally, the higher the temperature of the engine and its apparatuses installed in the suction system is, the greater amount of the gases reaches. The heating value of the engine and its apparatuses increases, and the scatter of oil increases accordingly, as the engine is operated at a higher load for a longer time. And when the engine has stopped, the temperature of the engine and its apparatuses becomes fairly high, which is further accelerated because the cooling effect of the suction air is no longer available after the engine stoppage, and a lot of volatile gas such as oil vapor is generated.

In other words, when the airflow through the suction system ceases as a result of the engine stoppage, gaseous material flows by diffusion and evaporation out of the engine 19 or its apparatuses, such as the turbo charger 13, installed in the downstream of the heating-resistor type mass airflow measuring apparatus 3A, or out of the suction pipe in which oil and fuel have scattered, and reaches the installation point of the heating-resistor type mass airflow measuring apparatus 3A and adheres onto the heating resistor 1, a mass airflow detecting element.

In particular, since volatile gas such as oil vapor evaporates and diffuses when the temperature of the engine or its apparatuses installed in the suction system is higher than the vaporization temperature of the gas after the engine stoppage, and flows backward to the installation point of the heating-resistor type mass airflow measuring apparatus 3A, it adheres also onto the heating resistor 1 exposed to the suction air. The adhesion of the gas results in the degradation of the measuring accuracy of the heating-resistor type mass airflow measuring apparatus 3A because of corrosion and/or contamination of the heating resistor 1. In addition, some dust that cannot be completely removed by the air cleaner 2 at the time of operating the engine again can adhere onto the heating resistor 1 more easily because of the above adhesion, possibly resulting in accelerated adhesion of foreign substance onto the heating resistor.

The heating resistor 1 of the heating-resistor type mass airflow measuring apparatus 3A is controlled of its heating during the mass airflow measurement, i.e. during the engine operation. The heating-resistor type mass airflow measuring apparatus 3A for measuring the mass airflow through an engine is normally so controlled that the heating temperature of the heating resistor 1 is higher than the suction air temperature by 120° C. to 220° C. which depends upon the type of the resistor. On the other hand, the vaporization temperature of the major ingredients of the oil vapor, which is a volatile gas most feared for, is 170° C. to 200° C. That is to say, when the heating resistor 1 is heated higher than the vaporization temperature, no oil vapor adheres onto the heating resistor 1 even if some reaches the heating resistor 1. Since the temperature of the gas containing the oil vapor is normally higher than 40° C., the temperature of the heating resistor 1 is 160° C. or higher, when powered, even on an heating-resistor type mass airflow measuring apparatus 3A in which the heating temperature is set lower. That is, if the temperature of the heating resistor 1 is maintained equal to or higher than the temperature during the engine operation, adhesion of oil onto the heating resistor 1 due to the oil vapor can be prevented. It is likely to happen that the heating temperature of the heating resistor 1 does not exceed the evaporation temperature of the oil as explained above or that the evaporation temperature can be much higher in case of a different type of oil, nevertheless, the adhesion of oil can be reduced more tremendously where the heating resistor 1 is heated than where it is not. While the above explanation refers to the vaporization temperature of the oil, the ingredients in the fuel vapor and exhaust are also hard to adhere when the heating resistor 1 is heated. In particular, since the oil has the highest vaporization temperature among the volatile gases whose generation is generally feared for, taking the vaporization temperature of the gas into account allows to reduce the adhesion of other gases onto the heating resistor 1.

According to this embodiment, the power control circuit 4 of the heating-resistor type mass airflow measuring apparatus 3A is installed inside the ECU 24 and power is continuously supplied to the heating-resistor type mass airflow measuring apparatus 3A via the power line 7 after the engine has stopped and until the volatile gas such as oil vapor has ceased to evaporate. The power control circuit 4 is preset with the time from after the engine stoppage until the volatile gas such as oil vapor has ceased to evaporate, and operates to stop supplying power to the heating-resistor type mass airflow measuring apparatus 3A when a certain length of time has elapsed after the engine stoppage. The above-mentioned certain length of time is the specified length of time explained using FIG. 2 (the time until the temperature of the engine and its apparatuses installed in the suction system has lowered below the generation temperature of volatile gas such as oil vapor after the engine has stopped).

With this construction, it becomes possible to reduce the effect of the adhesion onto the heating resistor caused while the engine is off and improve the measuring accuracy. When the temperature of the engine and its apparatuses installed in the suction system has lowered below the generation temperature of volatile gas such as oil vapor, no volatile gas is generated and adheres onto the heating resistor any longer, and so no problem is caused by stopping power supply to the heating resistor.

It is permissible that the heating temperature of the heating resistor 1 is maintained by continuing power supply to the heating-resistor type mass airflow measuring apparatus 3A until the engine cooling water or suction air temperature becomes lower than a specified temperature after the engine stoppage instead of stopping power supply after a certain length of time has elapsed after the engine stoppage.

Also according to this embodiment, as explained above, since the heating resistor 1 temperature is maintained equal to or higher than the temperature during the operation of the engine even after the engine has stopped and until the temperature of the engine and its apparatuses installed in the suction system has lowered below the generation temperature of volatile gas such as oil vapor, it becomes possible to reduce the effect of the adhesion onto the heating resistor caused while the engine is off and improve the measuring accuracy.

Figure 4:
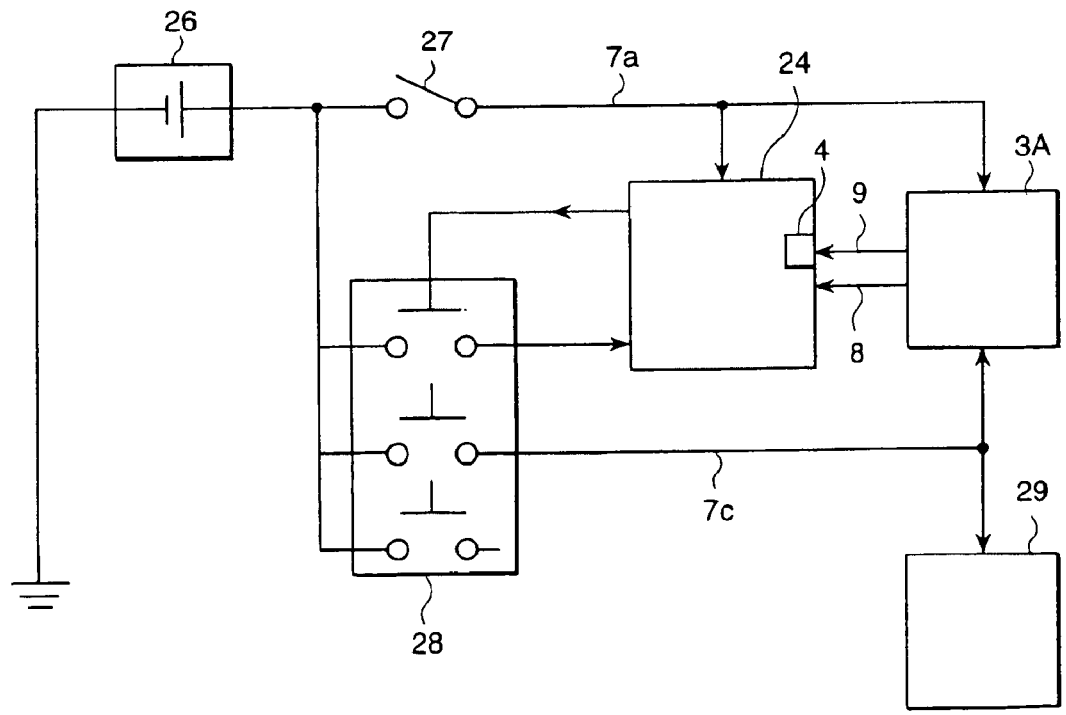
FIG. 4 is a system block diagram of the engine control system equipped with the mass airflow measuring apparatus according to the sixth preferred embodiment of the present invention.

Next, the construction and operation of the mass airflow measuring apparatus according to the sixth preferred embodiment of the present invention is explained hereunder, using FIG. 4.

FIG. 4 is a system block diagram of the engine control system equipped with the mass airflow measuring apparatus according to the sixth preferred embodiment of the present invention. The same symbol as in FIG. 3 denotes the same component.

Besides the connection 7a which is made between the heating-resistor type mass airflow measuring apparatus 3A and the battery 26, the power supply via an ignition switch 27, a new connection 7c to the power supply via a relay 28 is added. In a similar manner, one connection via the ignition switch 27 and the other via the relay 28 are also available between the ECU 24 and the battery 26. With these connections to the power, power supply to the ECU 24 and to the heating-resistor type mass airflow measuring apparatus 3A starts when the ignition switch 27 is turned ON. In addition, even when the ignition switch 27 is turned OFF, power supply continues if the relay 28 is ON. The ON/OFF action of the relay 28 is controlled by the ECU 24. That is to say, power supply to the heating-resistor type mass airflow measuring apparatus 3A can be continued as the ECU 24 keeps the relay 28 ON even after the engine stoppage, and power supply to the heating-resistor type mass airflow measuring apparatus 3A can be stopped in an appropriate length of time as the ECU 24 judges whether the temperature of the engine and its apparatuses installed in the suction system is lower than the generation temperature of volatile gas such as oil vapor.

The power control circuit 4, installed inside the ECU 24, controls to continue or stop supplying power to the heating-resistor type mass airflow measuring apparatus 3A. The power control circuit 4 judges, from the suction air temperature signal 9 obtained from the heating-resistor type mass airflow measuring apparatus 3A, whether the temperature of the engine and its apparatuses installed in the suction system has lowered below the generation temperature of volatile gas such as oil vapor, and when the temperature has lowered, the ECU 24 sets the relay 28 OFF and stops supplying power to the heating-resistor type mass airflow measuring apparatus 3A. In this operation, it is also permissible that the ECU 24 stops supplying power based on the signal from the water temperature sensor 22 shown in FIG. 3, or measures the elapsed time after the switch is turned OFF and stops supplying power when a specified length of time, by which the temperature of the engine and its apparatuses installed in the suction system has lowered below the generation temperature of volatile gas such as oil vapor, has elapsed.

The reason why two different power connections, one via the ignition switch 27 and the other via the relay 28, are employed for the heating-resistor type mass airflow measuring apparatus 3A is explained hereunder.

The control according to this embodiment can be realized using the single power connection to the heating-resistor type mass airflow measuring apparatus 3A via the relay 28 only. The connection via the relay 28, however, may possibly cause a momentary delay at the engine start, i.e. when power supply to the heating-resistor type mass airflow measuring apparatus 3A starts. It is desirous that the heating-resistor type mass airflow measuring apparatus 3A is directly connected to the ignition switch 27 so as to be able to start measuring the mass airflow properly as soon as the engine has started. Besides, power must be supplied continuously to the heating-resistor type mass airflow measuring apparatus 3A throughout the engine operation, but on the other hand, it may be necessary to turn off the cooling fan 29. The ON/OFF operation of the cooling fan 29 can be controlled easily by the relay 28, and power supply to the heating-resistor type mass airflow measuring apparatus 3A during the engine operation is made available using the ignition switch 27. Just for an information sake, the ECU 24 has two different power connections. While power supply to the ECU 24 after the engine stoppage is made via the relay 28, power to the ECU 24 is turned off by a so-called self-shutoff function, that is, turned off with the relay control signal for itself. At the time of engine start, power is supplied via the ignition switch 27 and the relay control also commences. With this construction, power loss while the engine is off is lessened and deterioration of the battery 26 is prevented, and at the same time, possible deterioration of the ECU itself to be caused when being set ON continuously can also be prevented.

Also according to this embodiment, as explained above, since the heating resistor 1 temperature is maintained equal to or higher than the temperature during the operation of the engine even after the engine has stopped and until the temperature of the engine and its apparatuses installed in the suction system has lowered below the generation temperature of volatile gas such as oil vapor, it becomes possible to reduce the effect of the adhesion onto the heating resistor caused while the engine is off and improve the measuring accuracy.

Next, the construction and operation of the mass airflow measuring apparatus according to the seventh preferred embodiment of the present invention is explained in a similar manner hereunder, using FIG. 4.

According to this embodiment, as shown in FIG. 4, the power connection 7c via the relay 28 is used as a common power connection for the cooling fan 29 for cooling the engine. In order to lessen the deterioration of the engine itself or its apparatuses installed on the engine due to heating, it is desirous to continue operating the cooling fan even after the engine stoppage and then stop when the temperature of the engine and its apparatuses has lowered below a level that should not cause a problem. Because the duration of the cooling fan operation after the engine stoppage depends upon the engine temperature, it is nearly equal to the suitable length of time during which power to the heating-resistor type mass airflow measuring apparatus 3 is continued. As a result, the ECU 24 can realize the power supply control over two different devices, which must be kept ON even after the engine stoppage, only with a single powering-OFF time setting and a single relay control. The powering-OFF time setting can be replaced, as explained previously, either with the time control where power is turned OFF after a certain length of time has elapsed after the engine stoppage or the temperature control where power supply is continued until the engine cooling water or suction air temperature becomes lower than a specified temperature after the engine stoppage.

Also according to this embodiment, as explained above, since the heating resistor 1 temperature is maintained equal to or higher than the temperature during the operation of the engine even after the engine has stopped and until the temperature of the engine and its apparatuses installed in the suction system has lowered below the generation temperature of volatile gas such as oil vapor, it becomes possible to reduce the effect of the adhesion onto the heating resistor caused while the engine is off and improve the measuring accuracy.

Figure 5:
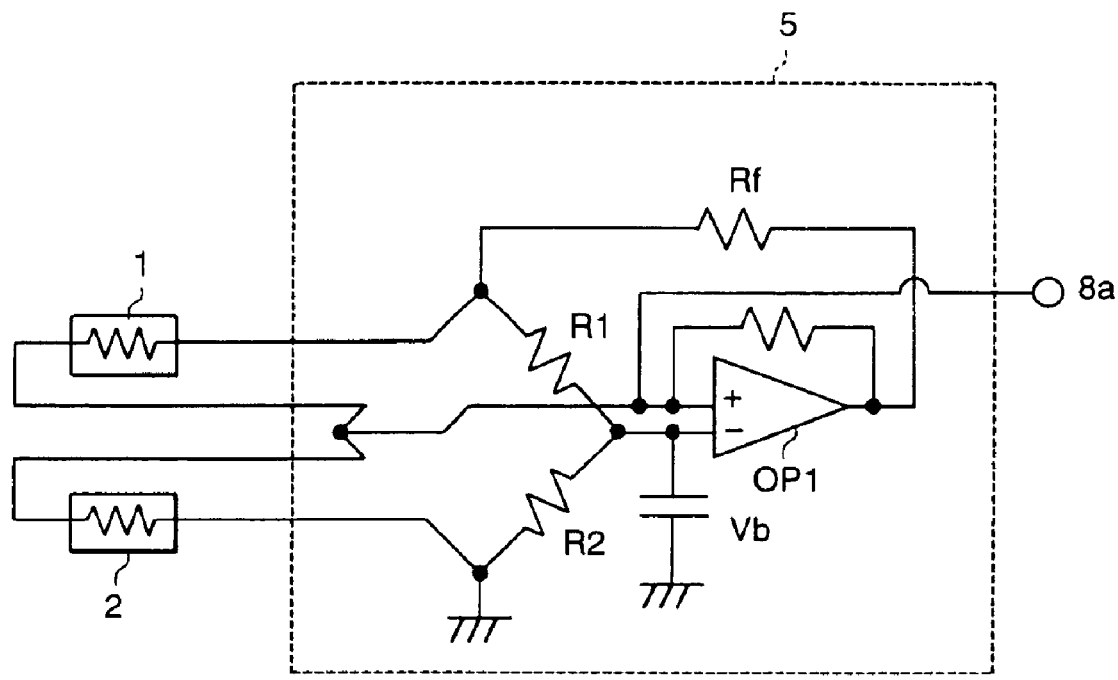
FIG. 5 is a circuit diagram of the important portion of the mass airflow measuring apparatus according to the sixth preferred embodiment of the present invention.
Figure 6:
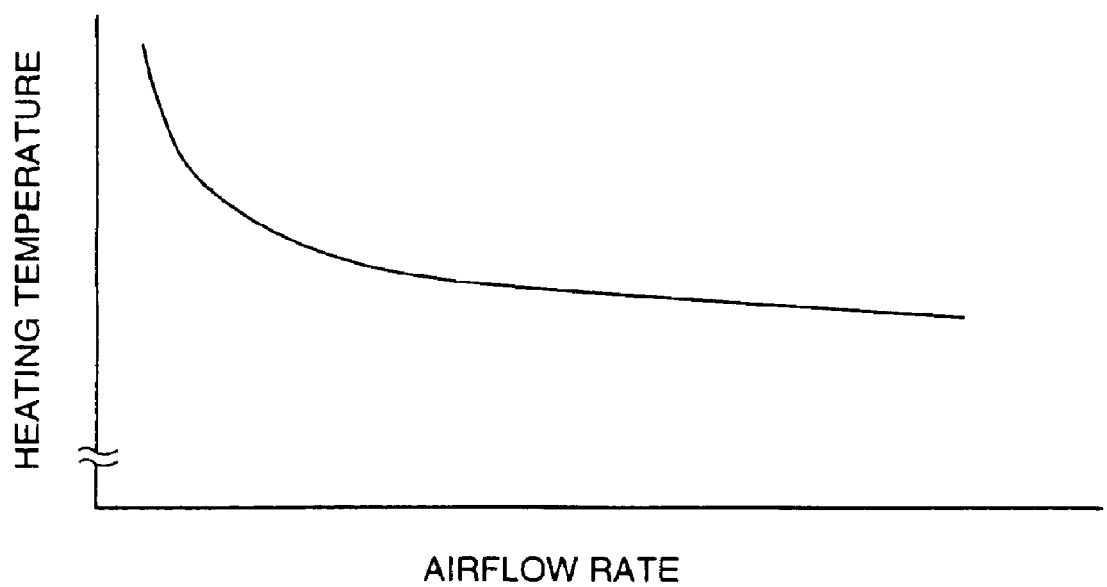
FIG. 6 is a characteristic diagram showing the mass airflow dependency of the heating-resistor heating temperature of the mass airflow measuring apparatus according to the sixth preferred embodiment of the present invention.

Next, the construction and operation of the mass airflow measuring apparatus according to the eighth preferred embodiment of the present invention is explained hereunder, using FIG. 5 and FIG. 6.

FIG. 5 is a circuit diagram of the important portion of the mass airflow measuring apparatus according to the sixth preferred embodiment of the present invention, and FIG. 6 is a characteristic diagram showing the mass airflow dependency of the heating-resistor heating temperature of the mass airflow measuring apparatus according to the sixth preferred embodiment of the present invention. In FIG. 5, the horizontal axis represents the mass airflow and the vertical axis represents the heating temperature of the heating resistor. The same symbol as in FIG. 1 denotes the same component.

According to this embodiment, with the constructions shown in FIG. 1, FIG. 3 and FIG. 4, the apparatus is so constructed that the temperature of the heating resistor 1 is maintained equal to or higher than the temperature during the operation of the engine after the engine has stopped and until the temperature of the engine and its apparatuses installed in the suction system has lowered below the generation temperature of volatile gas such as oil vapor.

Besides, according to this embodiment, the apparatus is so set that the heating temperature of the heating resistor becomes higher suddenly on the low airflow side.

The heating resistor 1 and temperature sensing resistor 2 form a bridge circuit along with the resistors R1 and R2 installed in the control circuit 5. The voltage at the middle point on each arm of the bridge circuit is inputted into two input terminals of the operation amplifier OP1. The operation amplifier OP1 then feeds back a signal to the bridge circuit via a feedback resistor Rf so that the differential between the two inputs becomes zero, and variable-controls the heating current of the heating resistor 1. The current through the heating resistor 1 is outputted, as a mass airflow signal 8a, into the output adjusting circuit 6 shown in FIG. 1.

Besides, according to this embodiment, the circuit is equipped with a power circuit Vb for applying voltage from outside the bridge circuit to the input of the operation amplifier OP1. Since a constant voltage is applied from the power circuit Vb to one input terminal of the operation amplifier OP1, a constant voltage differential can be applied all the time. The effect of applying a voltage with the power circuit Vb is greater on lower mass airflow where the end-to-end voltage of the bridge is low. With this construction, the heating temperature of the heating resistor can be so set as to become higher suddenly on the very-low mass airflow side as shown in FIG. 6. As a result, a mass airflow dependency that requires higher heating temperature at lower mass airflow can be added.

With the construction as explained above where the heating temperature is set to increase suddenly on the low mass airflow side, the heating temperature becomes higher at the time of zero mass airflow while the engine is off, or practically speaking, at the time of very low mass airflow caused by natural convection, as compared to the temperature at the time of medium mass airflow or high mass airflow during the engine operation. If the heating-resistor heating temperature within a mass airflow range during the engine operation is set, for example, to the suction air temperature +140° C. to 150° C. and the heating temperature on the very-low mass airflow side is set to about 180° C., and when the suction air temperature during the engine operation is, for example, at 25° C., the heating resistor temperature is 165° C. to 175° C., but on the other hand, when the engine has stopped and oil vapor is apt to be caused, the air temperature has become higher than 40° C. and the heating resistor temperature has exceeded 220° C. Since the vaporization temperature of the major ingredients of the oil vapor is 170° C. to 200° C., the heating resistor temperature after the engine stoppage is higher than the generation temperature of volatile gas such as oil vapor. Besides, even in case that some oil or additive with much higher vaporization temperature is used, and even if the vaporization temperature is as high as 250° C., little oil should adhere onto the heating resistor when the heating resistor is heated up to about 220° C. Besides, under a condition where an ingredient with higher vaporization temperature starts vaporizing, the air temperature has further increased and accordingly the heating resistor temperature also increases. If the air temperature is higher than 70° C., the heating resistor temperature is higher than 250° C., which is higher than the evaporation temperature.

Also according to this embodiment, as explained above, since the heating resistor 1 temperature is maintained equal to or higher than the temperature during the operation of the engine even after the engine has stopped and until the temperature of the engine and its apparatuses installed in the suction system has lowered below the generation temperature of volatile gas such as oil vapor, it becomes possible to reduce the effect of the adhesion onto the heating resistor caused while the engine is off and improve the measuring accuracy.

Also according to this embodiment, since the heating resistor temperature while the engine is off is increased higher than the heating temperature at the time of medium or high mass airflow, the effect of the adhesion can be reduced much more effectively.

Next, the construction and operation of the mass airflow measuring apparatus according to the ninth preferred embodiment of the present invention is explained in a similar manner hereunder, using FIG. 5.

According to this embodiment, a constant of the feedback circuit (for example, the resistance of the feedback resistor Rf in FIG. 5) is set so that some current runs through the temperature sensing resistor and the resistor is heated slightly higher than the air temperature. The current through the temperature sensing resistor is adjusted so as to cause the resistor to generate heat a little. If the heat generated is a little, however, the temperature of the temperature sensing resistor, when the mass airflow in creases to a certain level, becomes equal to the air temperature as the heat is radiated into the air. Since the heating resistor temperature is practically controlled to be higher than the temperature of the temperature sensing resistor by a specified temperature, the heating resistor temperature while the engine is off can be increased higher than the temperature during the engine operation by means of the above setting.

Also according to this embodiment, as explained above, since the heating resistor 1 temperature is maintained equal to or higher than the temperature during the operation of the engine even after the engine has stopped and until the temperature of the engine and its apparatuses installed in the suction system has lowered below the generation temperature of volatile gas such as oil vapor, it becomes possible to reduce the effect of the adhesion onto the heating resistor caused while the engine is off and improve the measuring accuracy.

Also according to this embodiment, since the heating resistor temperature while the engine is off is increased higher than the heating temperature at the time of medium or high mass airflow, the effect of the adhesion can be reduced much more effectively.

Each preferred embodiment above is effectively realized when an heating resistor of which heating temperature cannot be set so high and sensitivity over the mass airflow variation is very high is used for the heating-resistor type mass airflow measuring apparatus. A typical heating resistor like this includes a semiconductor-type heating resistor that comprises a diffused resistor formed on a silicon diaphragm. Of the semiconductor-type heating resistors, some cannot be heated high because increasing the heating temperature of the resistor too much results in the deterioration of the silicon substrate and diffused resistor. If the heating resistor employed cannot be heated high, it means that adhesion is apt to be caused easily.

In addition, since forming a diffused resistor on a silicon diaphragm results in smaller heat capacity of the heating resistor portion, the mass airflow measuring apparatus becomes very sensitive to the mass airflow variation. A sensitive mass airflow measuring apparatus like the above can be used for measuring the mass airflow not only in the normal direction but in the reverse direction if a temperature sensing resistor is installed in each upstream and downstream of the heating resistor. The heat capacity of a sensitive mass airflow measuring apparatus like this is very small, and this means that, if anything adheres onto the resistor, the heat capacity increases and the sensitivity decreases accordingly. Applying the embodiments of the present invention to an heating resistor like the above which cannot be heated so high and is very sensitive, it becomes possible to reduce the effect of the adhesion onto the heating resistor caused particularly while the engine is off and improve the measuring accuracy.

According to the present invention, it becomes possible to reduce the effect of the adhesion onto the heating resistor caused while the engine is off and improves the measuring accuracy.

What is claimed is:

1. A control system for an internal combustion engine comprising:

a control unit;

a heating-resistor type mass flow measuring apparatus including a heating resistor configured to detect mass airflow of air sucked into an internal combustion engine, an electronic circuit operatively connected to the heating resistor electrically, to output a signal corresponding to suction mass air flow, using the heating resistor; and means for maintaining after the internal combustion engine stopped, a heating resistor temperature at least equal to the temperature during operation of the internal combustion engine until the temperature of the internal combustion engine and associated apparatus thereof installed in suction system has decreased below a generation temperature of volatile gas, said maintaining means being a separate unit independent of said heating-resistor type mass flow measuring apparatus.

2. The control system as set forth in claim 1, wherein said maintaining means maintains the heating resistor temperature at a temperature higher than or equal to the heating resistor temperature during operation of said internal combustion engine based on elapsed time after stoppage of the internal combustion engine, at least equal to the temperature during operation of the internal combustion engine after the internal combustion engine has stopped.

3. The control system as set forth in claim 1, wherein said maintaining means maintains the heating resistor temperature at a temperature higher than or equal to the heating resistor temperature during operation of said internal combustion engine until a coolant temperature or an intake air temperature of said internal combustion engine becomes lower than or equal to a predetermined temperature.

4. The control system as set forth in claim 2, wherein a period to maintain the heating resistor temperature after stoppage of the internal combustion engine, higher than or equal to the temperature higher than or equal to the heating resistor temperature during operation of said internal combustion engine, is substantially equal to a period while a cooling fan of the internal combustion engine is driven after stoppage of the engine.

5. The control system as set forth in claim 3, wherein a power source is common for said heating resistor and said cooling fan and after stopping engine, while power is supplied to said cooling fan, the temperature of said heating resistor is maintained at the temperature higher than or equal to that while the internal combustion engine is driven.

6. The control system as set forth in claim 1, wherein an air flow rate dependency is provided for a heating temperature of said heating resistor while air flow rate is very low, for maintaining heating temperature high so that temperature of said heating resistor is maintained higher than or equal to the temperature during operation of said internal combustion engine as long as power supply for said heating-resistor type mass flow measuring apparatus is maintained even after stoppage of said internal combustion engine.

* * * * *